United States Patent [19]  [11]  4,423,018
Lester, Jr. et al.  [45]  Dec. 27, 1983

[54] BUFFERED FLUE GAS SCRUBBING SYSTEM USING ADIPIC ACID BY-PRODUCT STREAM

[75] Inventors: J. Harvey Lester, Jr.; Donald E. Danly, both of Pensacola, Fla.

[73] Assignee: Monsanto Company, St. Louis, Mo.

[21] Appl. No.: 391,083

[22] Filed: Jun. 23, 1982

[51] Int. Cl.³ .............................................. C01B 17/00
[52] U.S. Cl. .................................... 423/243; 423/242; 562/528
[58] Field of Search ............... 423/242 A, 242 R, 243, 423/244 A, 244 R; 562/528

[56] References Cited

U.S. PATENT DOCUMENTS 2,729,543  1/1956  Keller ................................. 423/243
3,632,306  1/1972  Villiers-Fisher et al. ............ 423/243
3,798,309  3/1974  Knowles ............................. 423/243
4,133,650  1/1979  Germerdonk et al. ......... 423/243 X
4,203,954  5/1980  Asanagi ............................. 423/243
4,222,993  9/1980  Holter et al. ...................... 423/243
4,375,552  3/1983  Kuceski ......................... 562/528 X

OTHER PUBLICATIONS

Article: "The Effect of Additives on Mass Transfer in $CaCO_2$ or CaO Slurry Scrubbing of $SO_2$ from Waste Gases," Gary T. Rochelle and C. Judson King, Authors, Industrial Engineering Chemical Fundamentals, vol. 16, No. 1, pp. 67–75.

Primary Examiner—Gregory A. Heller
Attorney, Agent, or Firm—Thomas Y. Awalt, Jr.

[57] ABSTRACT

A by-product stream from the production of adipic acid from cyclohexane, containing glutaric acid, succinic acid and adipic acid, is employed as a buffer in lime or limestone flue gas scrubbing for the removal of sulfur dioxide from combustion gases.

7 Claims, 8 Drawing Figures

BUFFERED FLUE GAS SCRUBBING SYSTEM USING ADIPIC ACID BY-PRODUCT STREAM

BACKGROUND OF THE INVENTION

A. Field of the Invention

This invention relates to the removal of $SO_2$ from waste gases, and to an improved scrubbing system for such removal employing an aqueous solution or slurry of lime or limestone buffered by reactants that are effective in enhancing liquid-phase mass transfer.

B. Background of the Invention

Since a typical modern coal-fired power plant may emit as much as 2,000,000 SCFM waste gas containing 2,000 ppm of $SO_2$, there is a greate deal of interest in processes for removal of $SO_2$ from these waste gases.

The most popular commercial process used for neutralizing $SO_2$ is an alkali aqueous scrubbing system with limestone for lime to neutralize $SO_2$ and produce $CaSO_3$:

$$CaCO_3 + SO_2 \rightarrow CaSO_3 + CO_2$$
$$CaO + SO_2 \rightarrow CaSO_3$$

In addition to the $CaSO_3$, some $CaSO_4$ is also produced because of the reaction with oxygen in the waste gas or air. The waste gas is ordinarily cooled to about 50° C. by direct contact with water in the scrubber. The $CaSO_3/CaSO_4$ solid product is disposed of as solid waste in evaporation ponds or as landfill. Because of the solids disposal involved, these processes are classified as "throw away" scrubbing.

Three basic types of throw away scrubbing include: "simple slurry", "double-alkali", and "slurry with soluble additives". Reference is made to the drawing in which FIG. 1 illustrates a simple slurry process in which the waste gas is scrubbed with a slurry of acid neutralization products and unreacted limestone. To avoid $CaSO_3$ and $CaSO_4$ crystallization and scaling in the scrubber, a separate crystallizer vessel is required with adequate residence time to control supersaturation of $CaSO_3$ and $CaSO_4$. Some of the CaO or $CaCO_3$ (depending upon which agent is used) dissolution must also occur in the crystallizer to avoid $CaSO_3$ scaling in the scrubber. The slurry solids concentration is typically controlled at 10–15 weight percent by clarification of a bleed stream.

In the double-alkali process, FIG. 3, $SO_2$ is absorbed into a clear solution of soluble alkali usually $NA_2SO_3$:

$$SO_3^{2-} + SO_2 + H_2O \rightarrow 2HSO_3^-$$

The solution is reacted with CaO or $CaCO_3$ in a separate vessel to precipitate $CaSO_3$ and regenerate $SO_3^{2-}$:

$$2HSO_3^- + CaO(s) \rightarrow CaSO_3(s) + SO_3^{2-} + H_2O$$
$$2HSO_3^- + CaCO_3(s) \rightarrow CaSO_3(s) + SO_3^{2-} + CO_2 + H_2O$$

The $CaSO_3$ solids are separated for disposal, and a clear solution is recycled to the scrubber. Because of this the entire recycle stream must pass through solid/liquid separation, but, in return, the problems of handling slurry in the scrubber are avoided. $CaSO_4$ is usually not crystallized as gypsum ($CaSO_4 \cdot 2H_2O$). Rather, sulfate is removed from the system as soluble purge or as a mixture of solids with $CaSO_3$.

Some development effort has been spent on slurry scrubbing with soluble additives (FIG. 2), which is a hybrid of simple slurry scrubbing and the double-alkali process. The process uses soluble alkalis or buffers as does the double-alkali process, and also recycles slurry to the scrubber as does the simple slurry process. Slurry scrubbing with soluble additives gives more rapid rates and larger capacities for $SO_2$ mass transfer than does a simple slurry process, but does not require as much capacity for liquid/solid separation as the double-alkali process. It has been known since 1977 that certain additives are useful as buffers and are effective in enhancing liquid phase mass transfer. Rochelle and King, by publication in INDUSTRIAL ENGINEERING CHEMICAL FUNDAMENTALS, Vol. 16, No. 1, identified adipic acid and isothalic acid as "fully effective" for mass transfer enhancement.

It is an object of this invention to provide an effective substitute for adipic acid which would be more environmentally and conservationally acceptable than adipic acid.

SUMMARY OF THE INVENTION

Figure 1:
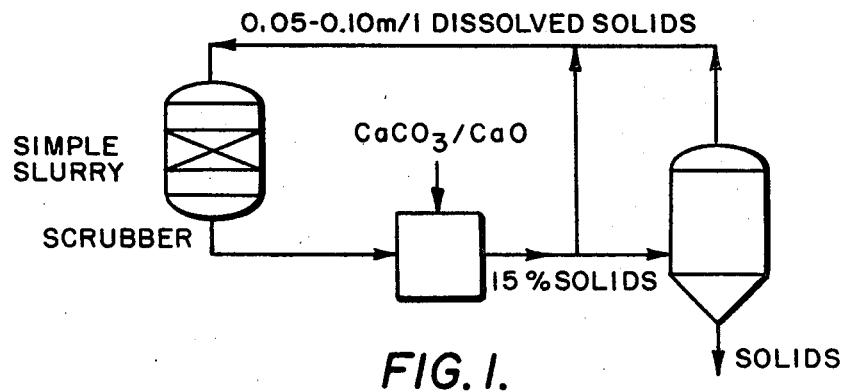
FIG. 1 illustrates a simple slurry process.
Figure 2:
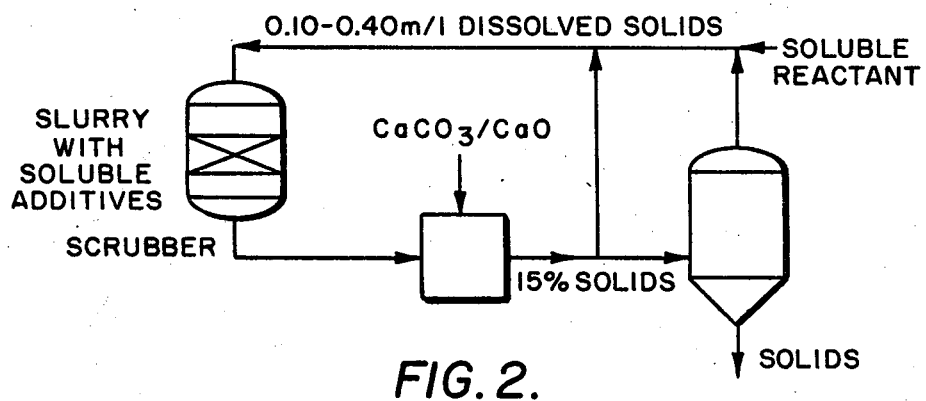
FIG. 2 illustrates a slurry scrubbing with soluble additives.
Figure 3:
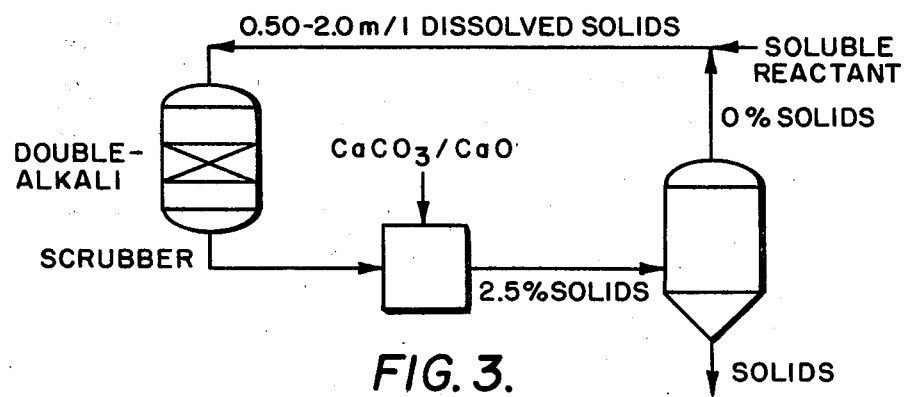
FIG. 3 illustrates a double alkali process

According to this invention, a limestone or lime flue gas scrubbing process is buffered by a by-product stream which is the by-product of a process comprising:

(1) oxidizing cyclohexane to cyclohexanol and cyclohexanone;

(2) oxidizing the cyclohexanol and cyclohexanone with a strong oxidizing acid into a product stream comprising adipic acid with minor amounts of glutaric and succinic acids;

(3) crystallizing adipic acid from the product stream in one or more stages leaving a by-product stream comprising glutaric acid, succinic acid, water and residual amounts of adipic acid, and the strong oxidizing acid.

DETAILED DESCRIPTION OF THE INVENTION

The by-product stream to which reference is made above is a waste stream of a well-known commercial process for producing adipic acid, a valuable and widely used chemical, involving a series of steps including:

(1) the oxidation of cyclohexane in a liquid phase with air or other molecular oxygen-containing gas to a mixture of cyclohexanol and cyclohexanone at rather low conversion but with high yields;

(2) the separation of the unoxidized cyclohexane from the mixed cyclohexanol and cyclohexanone intermediate reaction product;

(3) the final oxidation of the intermediate product with a strong oxidizing acid, such as nitric acid, into adipic acid with minor amounts of other dibasic organic acids, including glutaric acid and succinic acid, and (4) the isolation of the adipic acid from these by-product organic acids, such as by crystallization in one or more stages. The separation of adipic acid by crystallization from the reaction mixture, as a practical matter, cannot be carried to completion; and some adipic acid, consequently, remains in solution, together with glutaric acid and succinic acid.

Ultimately a waste liquor is produced which contains, in addition to the aforesaid organic dibasic acids, relatively minor amounts of monobasic acids, as well as nitric acid and water. A typical plant stream of a large manufacturing concern, for example, may run as high as several thousand pounds per hour, with the following representative composition:

| | |
|---|---|
| $H_2O$ | 68.2% |
| $HNO_3$ | 3.1% |
| Monobasic acids (as acetic acid) | 0.2% |
| Adipic acid (HOAd) | 5.5% |
| Succinic acid (HOSu) | 8.7% |
| Glutaric acid (HOGl) | 12.0% |
| Catalyst | 2.2% |

The aforesaid nitric acid oxidation normally is carried out in the presence of certain oxidation catalysts. One such catalyst found useful for nitric acid oxidation is a mixed catalyst system composed of certain vanadium and copper compounds, for example, ammonium vanadate and cupric nitrate. It has been found advantageous to remove and recover these catalytic materials from the adipic acid mother liquor before the same is used in accordance with the present invention. The separation of the catalytic material can be carried out by suitable procedures.

In one well known catalyst removal procedure the adipic acid mother liquor is brought into reacting contact with a cation exchange resin consisting of the hydrogen form of an oxidation-resistant water-insoluble polymerizate such as a sulfonated polyvinyl aryl compound cross-linked with a suitable amount of a divinyl aryl compound. The intimate contact of the solution with the polymerizate effects the simultaneous removal of the vanadyl ions and the cupric ions. The aqueous solution is separated from the polymerizate and is thus freed of most of the catalytic material.

As used in the above table giving a representative composition of a typical plant stream, the term "catalyst" includes any additives or catalysts used in the foregoing process which are not completely removed by subsequent removal procedures such as described immediately above. In one well known method of producing adipic acid, for example, the oxidation of cyclohexane takes place in the presence of boric acid. If a boric assisted cyclohexane oxidation process is used in conjunction with a catalytic nitric acid oxidation of KA oil employing a vanadium-copper catalyst, as described above, there will be residual amounts of copper and vanadium, as well as boric acid, in the waste stream. While these metals are thought to be beneficial in oxidizing $SO_3$ to $SO_4$, they are not to be considered essential elements of this invention.

Contrary to what has been indicated by prior studies that effective buffers include only acids which are intermediate in strength between carbonic acid and sulfurous acid, and whose calcium salt is reasonably soluble, a mixture of dibasic acid including succinic as a major component is an effective buffer despite the fact that calcium succinate is not reasonably soluble in water. Unlike succinic acid, calcium succinate is relatively insoluble in water when compared with calcium adipate. Calcium succinate has a solubility at 25° C. of only 1.26%, and the solubility at this temperature is a peak solubility with lower solubilities at higher and lower temperatures.

EXAMPLES

Figure 4:
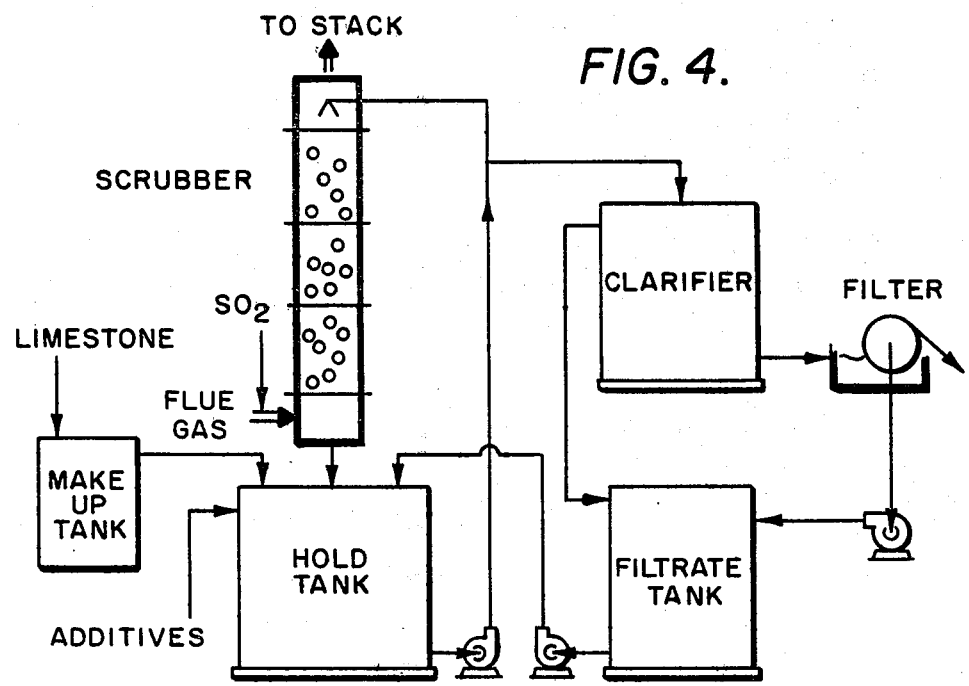
FIGS. 4 and 5 illustrates two scrubber configurations, natural and forced oxidation, respectively.
Figure 5:
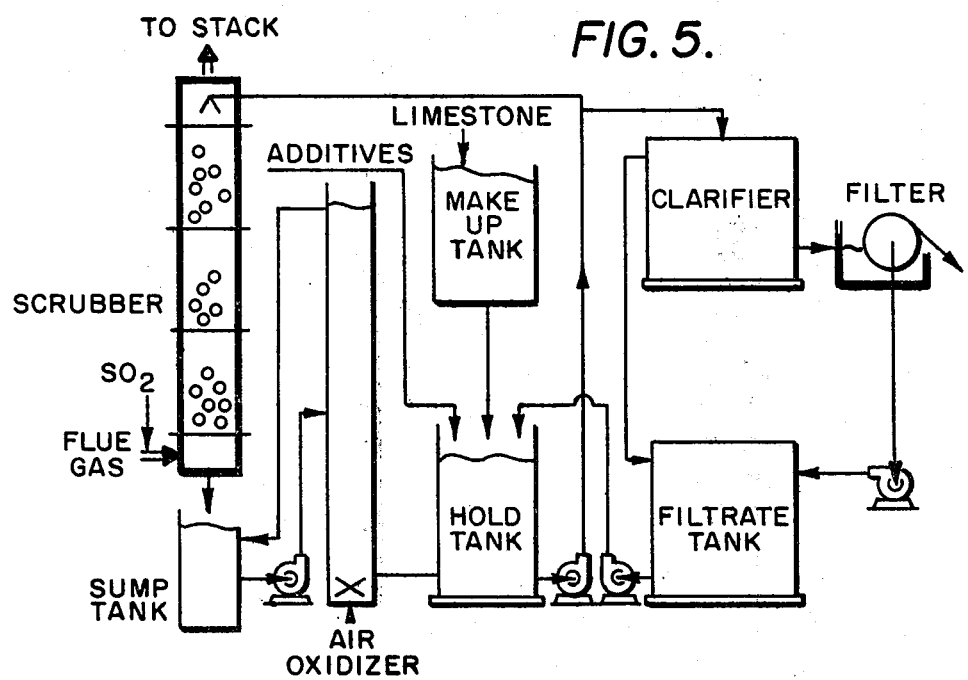

The test scrubbers were three-stage turbulent contact absorbers (TCA) with 7.5 m³/min flue gas capacity (0.1 MW). No fly ash was present in the flue gas, which was drawn from a gas-fired boiler and injected with pure $SO_2$. The two scrubber configurations, natural and forced oxidation, shown in FIGS. 4 and 5, respectively, were employed for these tests. The scrubber consists of a 30 cm diameter tower containing slurry at depth of 5.5 m which was sparged with air from the tower bottom. A bleed stream of slurry from the hold tank was directed to the clarifier and then processed by a rotary drum vacuum filter to remove the precipitated waste solids. All filtrate was returned to the scrubber in a closed operating loop mode. All additives were fed to the hold tank. Hold tank pH was controlled by adjusting the limestone slurry feed rate. Operating conditions are shown at Table I.

TABLE I

| OPERATING CONDITIONS | |
|---|---|
| TCA | Three beds with four-inch static bed height each |
| Packing | One and one-half inch diameter nitrile foam spheres |
| L/G (liquid/gas) | 8l/m³ (60 gal/kcf) with L at 1.1l/sec. |
| $SO_2$ | 2800 ppm of gas inlet |
| Flue gas oxygen | 6–8 percent |
| Cl in scrubbing liquor | 5000 ppm with HCl added to flue gas |
| Hold tank solids | 10 percent |
| Hold tank volume | 600 liter |
| $O/SO_2$ ratio | 3 (forced oxidation only) |

The operating conditions listed in Table 1 were utilized for the dibasic acid (DBA) tests. The $SO_2$ concentrations in the gas at the inlet and outlet of the scrubber were monitored continuously by an ultraviolet spectrophotometric analyzer (DuPont 400 $SO_2$ analyzer) and verified by a wet sampling (titrimetric procedure). Eighteen slurry samples and six filter cake samples were taken during each run. A complete slurry analysis was made every eight hours and the results, averaged over the total run period, were used for the material balance.

DBA was added to the hold tank at 2-hour intervals. The total organic acid concentration in the scrubbing liquor was analyzed by the silicic acid titration method. Composition of the stream fed to the scrubbers was as follows.

TABLE 2

TYPICAL COMPOSITION OF DIBASIC ACID STREAMS EMPLOYED

| | wt. % | | | |
|---|---|---|---|---|
| | #1 DBA | #2 DBA | | |
| Component | (solid) | (solid) | (liquid) | pKa |
| Glutaric acid | 51 | 58 | 15.7 | 4.34, 5.41 |
| Succinic acid | 22 | 23 | 6.4 | 4.16, 5.61 |
| Adipic acid | 18 | 14 | 4.5 | 4.43, 5.41 |
| Carboxylic acid anhydrides | 6 | 4 | 1.0 | |
| Organic nitrogen compounds | 2 | — | — | |
| Nitric acid | 0.1 | 0.05 | 3.8 | |
| Copper | 0.05 | 0.03 | — | |
| Vanadium | — | 0.063 | — | |

TABLE 2-continued
TYPICAL COMPOSITION OF DIBASIC ACID STREAMS EMPLOYED

| Component | #1 DBA (solid) wt. % | #2 DBA (solid) wt. % | #2 DBA (liquid) wt. % | pKa |
|---|---|---|---|---|
| Water | — | — | 68.4 | |

A series of short-term tests (50 hours each) was conducted to evaluate the effectiveness of DBA on improving $SO_2$ scrubber performance. The scrubber performance under operating conditions listed in Table I, but without the addition of organic acids, was taken as the base case. The effect of adipic acid on $SO_2$ removal efficiency and limestone utilization was tested following the base case and the results were used as the criteria for comparison of the effectiveness of the DBA's. Limestone utilization was measured as a function of pH in the hold tank.

Figure 6:
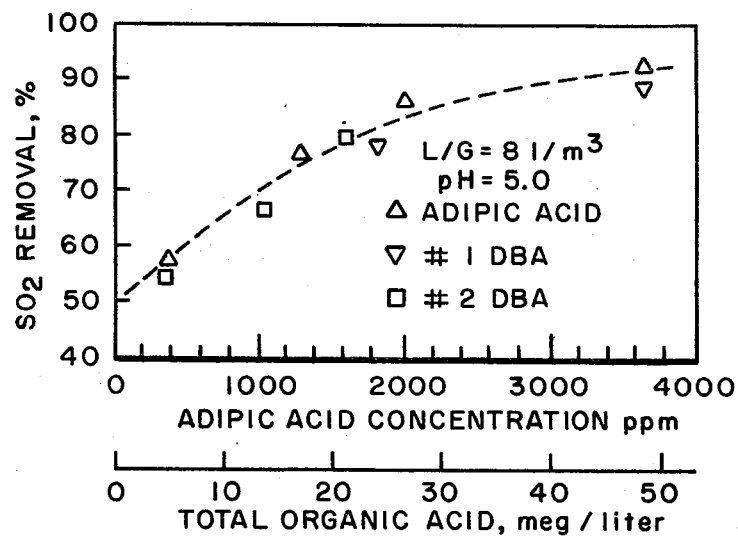
FIGS. 6, 7 and 8 illustrate comparison of scrubber performance with and without organic acid additives.
Figure 7:
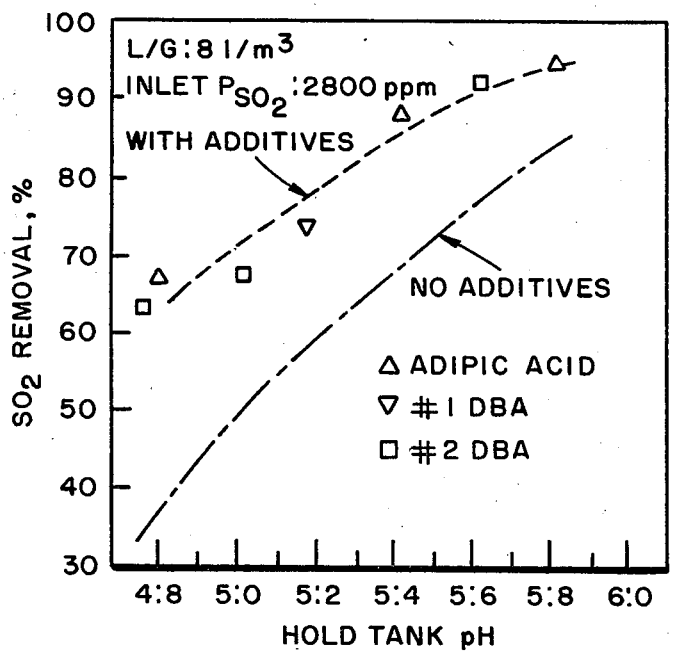
Figure 8:
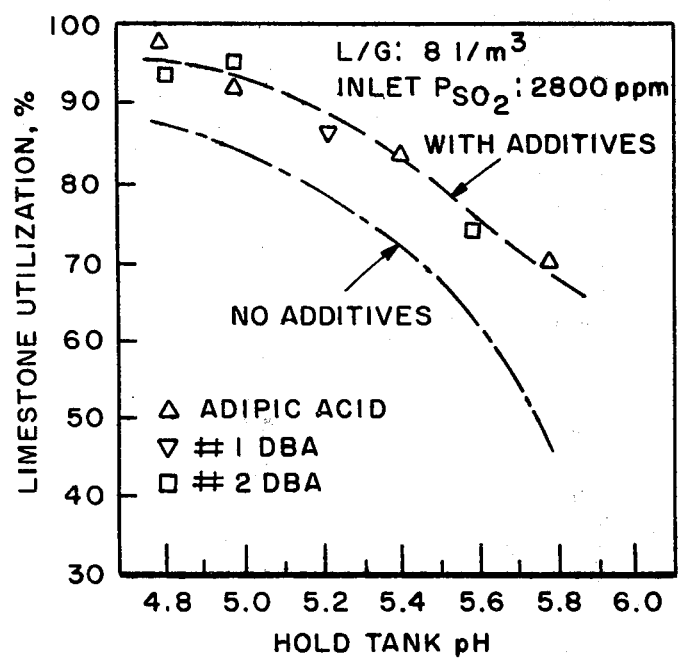

Comparisons of scrubber performance with and without organic acid additives are shown in FIGS. 6, 7, and 8. Milliequivalents per liter (meq/l) was chosen as the concentration unit for DBA because it does not involve molecular weight in the calculation and can be applied to both dibasic and monobasic organic acids. For pure adipic acid, one meq/l is equivalent to 73 ppm. FIG. 6 shows that both DBA's tested enhanced $SO_2$ removal significantly. With the addition of 50 meq/l of DBA, the $SO_2$ removal efficiency was increased from 50% to about 90%. Thus a workable concentration 2–70 meq/liter is indicated with a preferred concentration of 45–55 meq/liter. FIG. 6 also shows that both DBA's can improve $SO_2$ absorption rate as effectively as pure adipic acid. FIG. 7 indicates that the enhancement capacity of DBA's, like adipic acid, can be effected by pH value in the hold tank. For a given $SO_2$ removal efficiency, less DBA is required at higher pH's. FIG. 8 shows that DBA also increased the limestone utilization similarly to pure adipic acid.

We claim:

1. In a method for the removal of sulfur dioxide from waste combustion gases which comprises bringing the gases into interfacial contact with an aqueous solution or slurry of limestone or lime buffered by a compound or compounds which significantly increase the dissolution of limestone or lime, the improvement comprising employing as the buffer a byproduct stream which is the byproduct of the process comprising:
   (1) oxidizing cyclohexane to cyclohexanol and cyclohexanone;
   (2) oxidizing the cyclohexanol and cyclohexanone with a strong oxidizing acid into a product stream comprising adipic acid with minor amounts of glutaric and succinic acids;
   (3) crystallizing adipic acid from the product stream in one or more stages leaving said byproduct stream comprising glutaric acid, succinic acid, residual amounts of adipic acid and water, and the strong oxidizing acid.

2. The method of claim 1 wherein the oxidation of cyclohexane is in the presence of boric acid and the byproduct stream further includes residual amounts of the boric acid.

3. The method of claim 1 wherein the strong oxidizing acid is nitric acid and the byproduct stream further includes nitric acid.

4. The method of claim 3 wherein the byproduct stream further includes residual amounts of copper and vanadium.

5. The method of claim 1 wherein the oxidation is in the presence of boric acid and the strong oxidizing acid is nitric acid and the byproduct stream contains residual amounts of both boric acid and nitric acid.

6. The method of claim 1 wherein the organic acid concentration in the stream is 2–70 meq/liter.

7. The method of claim 5 wherein the concentration of organic acid in the stream is 45–55 meq/liter.

* * * * *

Dedication 4,423,018.—*J. Harvey Lester, Jr.*, and *Donald E. Danly*, Pensacola, Fla. BUFFERED FLUE GAS SCRUBBING SYSTEM USING ADIPIC ACID BY-PRODUCT STREAM. Patent dated Dec. 27, 1983. Dedication filed Aug. 17, 1984, by the assignee, *Monsanto Co.*

Hereby dedicates to the People of the United States the entire remaining term of said patent.

*[Official Gazette October 30, 1984.]*